June 24, 1930. A. E. WOLFF 1,768,184
VALVE
Filed Dec. 10, 1927
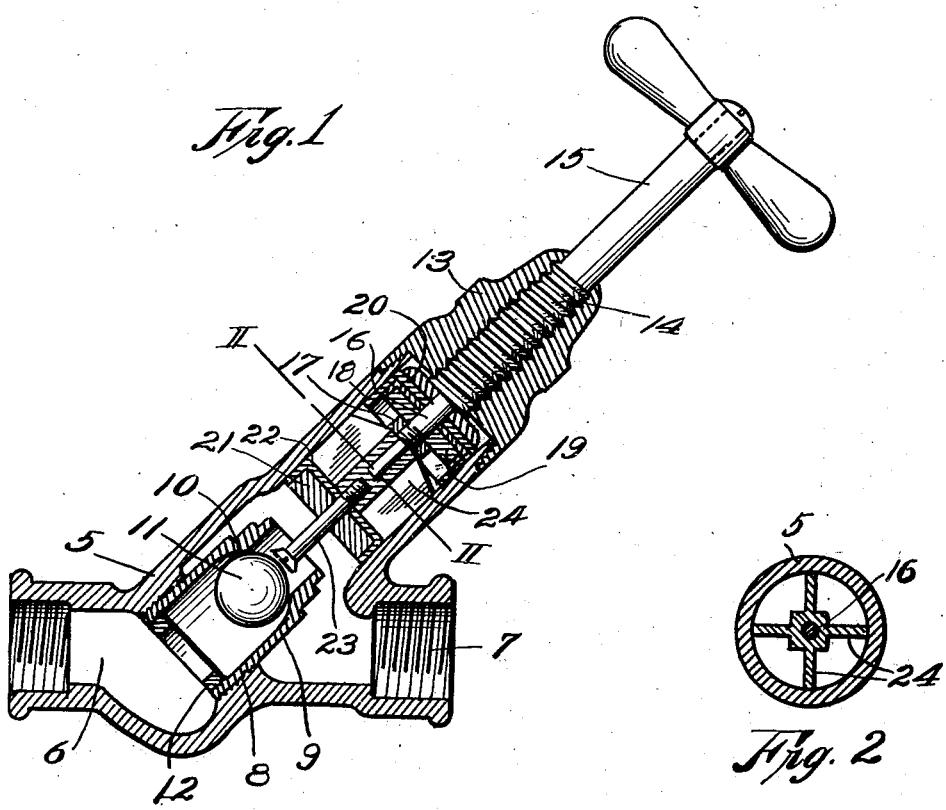
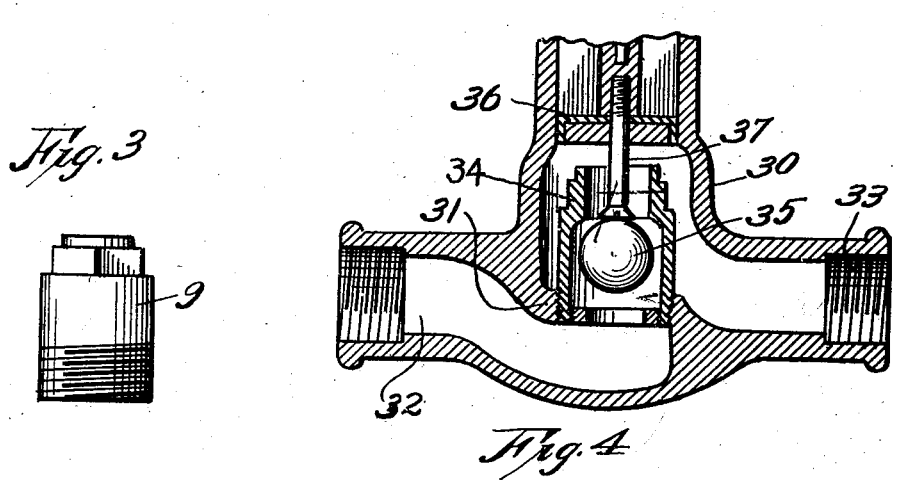
INVENTOR.
BY Alfred E. Wolff
Alfred Obeele,
ATTORNEY.

Patented June 24, 1930

1,768,184

UNITED STATES PATENT OFFICE

ALFRED E. WOLFF, OF KANSAS CITY, MISSOURI

VALVE

Application filed December 10, 1927. Serial No. 239,061.

This invention relates to valves for controlling the passage of fluids, such as, steam or water gas, air or oil and other materials, through pipes, the primary object of the invention being to provide a valve including a removable inner valve housing in which an automatically controlled ball valve is held, to the end that the main valve of the device may be removed to replace worn parts thereof without the necessity of cutting off the water or steam supply with which the valve is associated.

Another object of the invention is to provide a valve of this construction wherein the various elements of the valve may be readily assembled and disassembled, permitting the repairing of the valve with facility.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a valve constructed in accordance with the invention.

Figure 2 is a sectional view taken on line 2—2 of Figure 1.

Figure 3 is an elevational view of the auxiliary valve housing.

Figure 4 is a longitudinal sectional view through a modified form of the invention.

Referring to the drawing in detail, the reference character 5 designates the valve body, which is provided with an inlet opening 6 and an outlet opening 7.

Between the inlet and outlet openings is a threaded portion 8 in which the threaded extremity of the housing 9 is positioned, the housing 9 being provided with a rounded surface 10 defining a valve seat for the ball valve 11, to the end that the valve 11 may, when seated, prevent the passage of fluid through the valve body.

At the opposite end of the valve housing 9 is a removable valve seat 12 against which the ball valve 11 may contact to prevent the ball valve from passing from the valve housing when the pressure within the valve body has been relieved.

The reference character 13 indicates the removable head forming a part of the valve, the head being provided with internal threads to accommodate the threaded portion 14 of the valve stem 15. At one end of the valve stem is a reduced portion 16 which is threaded as at 17, to accommodate the nut 18 that contacts with the washer 19 to hold the washer in its cup 20.

The main valve includes a removable washer 21 that is held within the cup 22, the washer and cup being supplied with openings to receive the pin 23, which is formed with a threaded extremity that moves into a threaded opening of the guide 24 to secure the washer and its cup within the valve body.

Thus it will be seen that due to this construction, the main valve may be moved to contact with one end of the valve housing 9, thereby cutting off the supply of water or the fluid passing through the valve body proper.

When it is desired to open the valve the valve stem 15 is moved in the opposite direction, whereupon the pin will act as a check to prevent the ball valve from seating at the upper end of the valve housing, but should it be desired to remove the valve head to replace the washer thereof, the ball valve will automatically assume a position as shown by Figure 1 to prevent the passage of fluid through the valve body while the main valve is being repaired.

In the form of the invention as shown by Figure 4, the valve body is indicated generally by the reference character 30, there being provided a partitioning member 31 within the valve body, separating the inlet end 32 from the outlet end 33, the partitioning member being provided with threads to receive the vertical valve housing 34.

This vertical valve housing is formed with a valve seat against which the ball valve 35 moves, to automatically cut off the passage of liquid to the valve body.

The upper end of the valve housing 34 constitutes a seat for the valve member 36 which valve member carries the pin 37 designed to engage the ball valve 35 to hold the ball valve against the pressure of the inflowing liquid to prevent the liquid from passing through the valve body.

In this form of the invention it will also be seen that a person may by removing the valve proper, readily repair the same, the pressure of the fluid acting against the ball valve to cause the same to seat and prevent the passage of water through the valve body while repairs are being made.

After repairs have been made and the main valve has again been positioned, the pin 37 will act to force the ball valve 35 from its seat, allowing the fluid to again pass through the valve body.

I claim as my invention:

1. A valve of the class described including a body portion having an inlet opening and an outlet opening, a removable ball valve housing within the valve body and having an internal valve seat, a ball valve in the valve housing and adapted to contact with the internal valve seat to restrict the passage of liquid through the valve body, a manually controlled removable main valve and auxiliary valve operating in the valve body and adapted to engage one end of the valve housing, and means for substituting the auxiliary valve for the main valve.

2. A valve assembly of the class described including a valve body having an inlet opening and an outlet opening, a ball valve housing removably supported within the valve body and having an internal valve seat, a ball valve operating within the valve housing, a main valve adapted to engage one end of the valve housing to restrict the passage of liquid through the valve body, means disconnected from the ball valve and movable within the valve body for contacting with the ball valve to unseat the ball valve, and means for removing the main valve without interfering with the function of the valve assembly.

3. A valve of the class described including a valve body, a removable valve housing supported within the valve body, said valve housing having a valve seat formed internally thereof, and a valve seat formed externally thereof, a ball valve within the valve housing and adapted to contact with the internal valve seat to cut off the supply of liquid through the valve body, and a removable main valve adapted to engage the external valve seat to control the passage of fluid through the body portion, and a manually operated third valve adapted to replace the removable main valve.

4. A valve of the class described including a valve body having internal threads, a removable valve housing having a threaded portion cooperating with the internal threads to secure the valve housing into position, a ball valve operating in the valve housing and adapted to seat within one end of the valve housing under the pressure of the liquid passing into the valve body, a removable main valve member operating above the valve housing and adapted to engage one end of the valve housing, to cut off the passage of liquid through the valve body, and means for operating the main valve, and an auxiliary movable third valve situated above the main valve.

ALFRED E. WOLFF.